United States Patent [19]

Kapps et al.

[11] Patent Number: 4,575,520

[45] Date of Patent: Mar. 11, 1986

[54] RIGID, CLOSED-CELL, FLAME-RESISTANT POLYURETHANE FOAMS

[75] Inventors: Manfred Kapps, Bergisch-Gladbach; Rolf Wiedermann, Odenthal; Norbert Adam, Cologne; Eckehard Weigand, Roesrath, all of Fed. Rep. of Germany

[73] Assignee: Bayer Aktiengesellschaft, Leverkusen, Fed. Rep. of Germany

[21] Appl. No.: 691,813

[22] Filed: Jan. 16, 1985

[30] Foreign Application Priority Data

Jan. 24, 1984 [DE] Fed. Rep. of Germany ....... 3402310

[51] Int. Cl.[4] ...................... C08G 18/14; C08G 18/76; C08G 18/48

[52] U.S. Cl. .................................. 521/107; 521/108; 521/129; 521/167; 521/175; 521/176

[58] Field of Search ............... 521/175, 107, 167, 176, 521/108, 129

[56] References Cited

U.S. PATENT DOCUMENTS

| | | | |
|---|---|---|---|
| 3,072,582 | 1/1963 | Frost | 521/175 |
| 3,723,365 | 3/1973 | Speranza et al. | 521/175 |
| 3,783,133 | 1/1974 | Speranza | 521/175 |
| 3,933,690 | 1/1976 | D'Alelio et al. | 521/175 |
| 4,111,828 | 9/1978 | Wang | 521/175 |
| 4,216,296 | 8/1980 | Wernsing | 521/175 |

FOREIGN PATENT DOCUMENTS 3101748 3/1982 Fed. Rep. of Germany .

*Primary Examiner*—Herbert S. Cockeram
*Attorney, Agent, or Firm*—Gene Harsh; Joseph C. Gil; Lyndanne M. Walen

[57] ABSTRACT

Rigid, closed-cell, flame-resistant polyurethane foams are produced by reacting a polyol mixture with a polyphenyl-polymethylene-polyisocyanate in the present of a catalyst system. The polyol mixture includes: (1) from 25 to 43 wt % flame proofing agent, (2) from 5 to 50 wt % sucrose polyether having an OH number of from 350 to 550, (3) from 0 to 30 wt % amine initiated polyethers having an OH number of from 400 to 800, (4) from 0 to 30 wt % other polyether or polyester having an OH number of from 150 to 600, (5) from 4 to 13 wt % glycerol, (6) from 0.5 to 3 wt % silicone stabilizer and (7) from 0.05 to 1.5 wt % water. The catalyst system is made up of at least two components selected from tertiary amines, alkali metal carboxylates, quaternary ammonium carboxylates and organic tin compounds. The reactants are employed in quantities such that the NCO to OH equivalent ratio is from 1.07 to 1.45 (the isocyanate-index is from 1.07 to 1.45). The foams of the present invention are particularly useful in the production of roof insulating boards, insulation of containers, pipelines, etc. and for sealing and insulating roofs and walls.

9 Claims, No Drawings

RIGID, CLOSED-CELL, FLAME-RESISTANT POLYURETHANE FOAMS

BACKGROUND OF THE INVENTION

The present invention relates to rigid, closed-cell, flame resistant polyurethane foams and to a process for the production thereof.

Rigid, closed-cell polyurethane-rigid foams, which have a flame resistance in accordance with the fire classification B2 according to DIN 4102 have become increasingly more important in the building industry. Many proposals have been made over the years for producing polyurethane-rigid foams which have been rendered flame-resistant.

One proposal involves producing polyurethane foams which have polyisocyanurate structures. Structures of this type may be detected if more than 1.5 isocyanate equivalents for each hydroxyl equivalent (that is, the isocyanate-index is above 1,5) are reacted in the presence of trimerization catalysts. Foams of this type are not generally used, however, because they are often brittle and cannot be produced using all standard apparatus due to their sensitivity to the effects of heat during production.

Another process for producing flame-resistant polyurethane rigid foams requires use of a flame-proofing agent in the production of such foams. A distinction is generally made between reacting and non-reacting flame-proofing agents. If large quantities of non-reacting flame-proofing agents are used, a foam having poor properties is obtained. Large quantities of reacting flame-proofing agents are often low-functional and make the foam flexible. Relatively high functional flame-proofing agents produce high viscosities, which create difficulties when producing the foam.

German Offenlegungsschrift No. 31 01 748 for example, describes the relationships between the content of flame-proofing agent and behavior under fire and between the flame-proofing agent, hydroxyl number and hardening.

SUMMARY OF THE INVENTION

It is an object of the present invention to provide rigid, closed-cell, flame-resistant polyurethane foams.

It is also an object of the present invention to provide rigid, closed-cell, flame-resistant polyurethane foams in which a relatively small quantity of flame-proofing agent is present.

It is another object of the present invention to provide a process for the production of rigid, closed-cell, flame-resistant polyurethane foams.

These and other objects which will be apparent to those skilled in the art are accomplished by reacting a polyphenyl-polymethylene-polyisocyanate with a polyol mixture containing specific amounts of specific components in the presence of a catalyst system. The polyisocyanate must contain from 30 to 60 wt % diphenyl-methane diisocyanate. The polyol mixture includes a flame-proofing agent, sucrose polyethers, glycerol, silicone stabilizer and water. Amine-initiated polyethers and other polyethers and polyesters may optionally be included. The catalyst mixture is made up of at least two components selected from tertiary amines, alkali metal carboxylates, quâternary ammonium carboxylates and organic tin compounds. The polyisocyanate and polyol mixture are used in quantities such that the NCO to OH equivalent ratio is from 1.07 to 1.45 (the isocyanate-index is from 1.07 to 1.45).

DETAILED DESCRIPTION OF THE INVENTION

The present invention relates to rigid closed-cell flame-resistant polyurethane foams made by reacting polyisocyanates with relatively high molecular weight polyols, in the presence of flame-proofing agents, organic blowing agents, cross-linking agents, catalysts and water. The polyol component is a mixture of:

(1) from 25 to 43 wt % (based on total polyol component mixture) of conventional flame-proofing agents;
(2) from 5 to 50 wt % (based on total polyol component mixture) of sucrose polyethers having an OH number of from 350 to 550;
(3) from 0 to 30 wt % (based on total polyol component mixture) of amine-started polyethers having an OH number of from 400 to 800;
(4) from 0 to 30 wt % (based on total polyol component mixture) of other polyethers or polyesters having an OH number of from 150 to 600;
(5) from 4 to 13 wt % (based on total polyol component mixture) of glycerol;
(6) from 0.5 to 3 wt % (based on total polyol component mixture) of a silicone stabilizer; and
(7) from 0.05 to 1.5 wt % (based on total polyol components mixture) of water.

This polyol component is reacted at an isocyanate-index of from 1.07 to 1.45 (i.e., NCO to OH equivalent ratio of from 1.07 to 1.45) with a polyphenyl-polymethylene-polyisocyanate containing from 30 to 60 wt % based on total isocyanate of 4,4'- and 2,4'-diphenylmethane diisocyanate. This reaction is carried out in the presence of a catalyst which is a mixture of tertiary amines, alkali metal and/or quaternary ammonium carboxylates and organic tin compounds in which at least two of the above-mentioned constituents should be present. The isocyanate-index number is preferably from 1.11 to 1.35.

A polyphenyl-polymethylene-polyisocyanate suitable for producing the foams of the present invention may be obtained by aniline/formaldehyde condensation and subsequent phosgenation (commonly referred to as "crude MDI"). Crude MDI has a 4,4'- and 2,4'-diphenylmethane diisocyanate content (a "two nuclei content") of from 30 to 60 wt %, preferably from 30 to 49 wt %. These polyisocyanate constituents are reacted with the above-mentioned polyol mixture, thereby forming the foam.

The conventional flame-proofing agents which are included in the polyol mixture are materials which may or may not be incorporated into the foam. Such flame-proofing agents are known. Specific examples of suitable flame-proofing agents are: tris-chloroethyl phosphate, diphenyl cresyl phosphate, tri-cresyl phosphate, ammonium phosphate and polyphosphonate, phosphonic acid esters, such as methyl-phosphonic acid dimethyl esters and esters such as those disclosed in German Offenlegungsschrift No. 27 50 555, di-bromobutene diol polyethers such as those disclosed in German Offenlegungsschriften Nos. 23 23 702 and 24 45 571 and the phosphoric acid esters disclosed in German Auslegeschrift No. 1 181 411. It is preferred that the flame-proofing agent be a phosphorus and/or halogen-containing compound.

The sucrose polyethers having an OH number of from 350 to 550 which are included in the polyol mixture are also known and may be obtained in known manner by reacting saccharose with alkylene oxides, such as propylene oxide and/or ethylene oxide. Sucrose polyethers of this type are described for example in German Auslegesschriften Nos. 1,176,358 and 1,064,938.

The amine-initiated polyethers having an OH number of from 400 to 800 are also known. These polyethers may be obtained, for example, by adding epoxides such as propylene oxide and/or ethylene oxide, to amines such as ammonia, aniline, toluylene diamine, ethanolamine or ethylene diamine.

Other polyethers or polyesters having an OH number of from 150 to 600 which may be contained in the polyol mixture are also conventional materials. Polyethers may be obtained in known manner by adding alkylene oxides, such as propylene oxide and/or ethylene oxide, to low molecular weight compounds having reactive hydrogen atoms, such as water or alcohols. Such polyethers may also be obtained by polymerizing epoxides with themselves, for example, in the presence of Lewis catalysts, such as $BF_3$. Polyesters having hydroxyl groups which are suitable for the practice of the present invention are, for example, reaction products of polyhydric (preferably dihydric and optionally also trihydric) alcohols and polybasic (preferably dibasic) carboxylic acids.

The polyol mixture contains glycerol as a cross-linking agent.

The silicone stabilizers which are present in polyol mixtures are known foam stabilizers. Polyether siloxanes are particularly useful. These compounds are generally structured so that a co-polymer of ethylene oxide and propylene oxide is bound to a polydimethyl siloxane radical. Silicone foam stabilizers which have a different structure for example, silicone foam stabilizers which do not contain polyether may also be employed.

The polyol mixture contains water which acts as a blowing agent. In addition, organic blowing agents, such as halogen-substituted alkanes (e.g., methylene chloride, chloroform, ethylidene choride, vinylidene chloride, monofluorotrichloromethane, chlorodifluoromethane and dichlorodifluoromethane) may be used in a quantity of from 10 to 50 wt % based on the polyol mixture. Further exmples of blowing agents which may also be used and information about the use of blowing agents may be found in the Kunststoff Handbuch, Vol. VII, published by Vieweg and Hochtlen, Carl-Hanser-Verlag, Munich 1966, e.g. on pages 108 and 109, 453 to 455 and 507 to 510.

A catalyst mixture made up of tertiary amines and/or alkali metal carboxylates and/or quaternary ammonium carboxylates and/or organic tin compounds is used in the present invention. At least two of the above-mentioned constituents should be present in the mixture.

The following are examples of appropriate tertiary amines: triethylamine, tributylamine, N-methyl-morpholine, N-ethyl-morpholine, N,N,N',N'-tetramethyl-ethylene diamine, pentamethyl-diethylene triamine and higher homologues (German Offenlegungsschriften Nos. 2,647,527 and 2,624,528), 1,4-diazabicyclo-(2,2,2,)-octane, N-methyl-N'-dimethyl-aminoethylpiperazine, bis-(dimethylaminoalkyl)-piperazine (German Offenlegungsschrift No. 2,636,787), N,N-dimethylbenzylamine, N,N-dimethyl-cyclohexylamine, N,N-diethylbenzylamine, bis-(N,N-diethylaminoethyl)-adipate, N,N,N',N'-tetramethyl-1,3-butadiamine, N,N-dimethyl-phenylethylamine, 1,2-dimethylimadazole, 2-methylimidazole, monocyclic and bicyclic amidines (German Offenlegungsschrift No. 1,720,633), bis-(dialkylamino)alkyl-ether (U.S. Pat. No. 3,330,782, German Auslegeschrift No. 1,030,558, German Offenlegungsschriften Nos. 1,804,361 and 2,618,280) and tertiary amines which have amide groups (preferably formamide groups) according to German Offenlegungsschriften Nos. 253,633 and 2,732,292.

The following are examples of tertiary amines having isocyanate-reactive hydrogen atoms, which may be used as a catalyst component: triethanolamine, triisopropanolamine, N-methyl-diethanolamine, N-ethyl-diethanolamine, N,N-dimethylethanolamine, the reaction products thereof with alkylene oxides (such as propylene oxide and/or ethylene oxide) and secondary tertiary amines according to German Offenlegungsschrift No. 2,732,292.

The following are examples of alkali metal carboxylates: potassium acetate and -octoate, sodium acetate and -octate. The following are examples of quaternary ammonium carboxylates: trimethylbenzyl ammonium acetate and compounds such as those disclosed in German Offenlegungsschrift No. 2,631,733.

The following are examples of suitable organic tin compounds: sulphur-containing compounds, such as di-n-octyl-tin mercaptide (German Auslegeschrift No. 1,769,367; U.S. Pat. No. 3,645,927); tin (II)-salts of carboxylic acids, such as tin(II)-acetate, tin(II)-octoate, tin(II)-ethylhexoate and tin(II)-laurate; and tin(IV) compounds, such as dibutyl tin oxide, dibutyl tin dichloride, dibutyl tin diacetate, dibutyl tin dilaurate, dibutyl tin maleate and dioctyl tin diacetate.

Information about the action of the catalysts may be found in the Konststoff-Handbuch, Vol. VII, published by Vieweg and Höchtlen, Carl-Hanser-Verlag, Munich 1966, on pages 96 to 102.

The catalyst mixture is generally used in a quantity of from 0.2 to 3 wt %, based on the polyol mixture.

The catalysts of the catalyst mixture suffer from the disadvantage, as is shown by the Comparative Examples infra, that the resulting foam has inadequate fire properties if only tertiary amine is used.

Stabilizers against the effects of ageing and exposure, plasticizers and fungistatically- and bacteriostatically-acting materials and fillers, such as barium sulphate, kieselgur, carbon black and prepared chalk, may also be used in producing the foams according to the present invention.

In the process of the present invention, the reaction constituents are reacted by the known one-stage process, the prepolymer process or the semi-prepolymer process, often with the aid of mechanical apparatus, such as the apparatus described in U.S. Pat. No. 2,764,565. Information about processing apparatus which is suitable according to the present invention is also found in the Kunststoff Hanbuch Vol. VII, published by Vieweg and Hochtlen, Carl-Hanser-Verlag, Munich 1966 e.g. on pages 121 to 205.

To produce the foam of the present invention, foaming may be carried in closed molds, According to this method, the reaction mixture is introduced into a mold. Metals, such as aluminum, or plastics, such as epoxide resins, are suitable materials for the mold. The foamable reaction mixture foams in the mold and forms the molding. In situ foaming may be carried out in such a way that the molding has a cellular structure on the surface thereof, or it may also be carried out in a manner such that the molding has a compact skin and a cellular core.

The process of the present invention may be carried out by introducing just enough foamable reaction mixture into the mold so that the foam which is foamed fills the mold exactly. The process may also be carried out by introducing more foamable reaction mixture into the mold than is required to fill the mold cavity with foam. In the latter case, the process is carried out with "overcharging". This latter method is described in U.S. Pat. Nos. 3,178,490 and 3,182,104.

In many cases, known external mold-release agents, such as silicone oils, may also be used in in situ foaming. So-called "internal mold-release agents" may also be used, optionally in admixture with external mold release agents, as is disclosed, for example, in German Offenlegungsschriften Nos. 2,121,670 and 2,307,589.

Foams may, of course, also be produced by block foaming or by the known laminator process or they may be cast, produced on-site by the processes of pouring, layer-on-layer or spray-on.

The foams of the present invention may be used, for example, as roof insulating boards, cladding panels, flooring elements, for the insulation of containers, pipelines, etc. and for sealing and insulating roofs and walls etc.

The following Examples are intended to illustrate the present invention in more detail, without in any way limiting the scope of the invention.

EXAMPLES

Example 1

A polyol mixture made up of:

33.3 wt % of sucrose/propylene glycol-propylene oxide-polyether (OH-number 470, having about 17 wt % of propylene glycol-polyether);

16.6 wt % of ethylene diamine-propylene oxide-polyether (OH number 630);

10.0 wt % of glycerol;

10.0 wt % of polyol having an OH number of 440, based on a phosphonic acid ester (12.2%P) (a flame-proofing agent described in German Offenlegungsschrift No. 2,750,555);

8.1 wt % of dibromo butene diol-epichlorohydrin-polyether (OH number 330, 33% Br, 6.8% Cl) (flame-proofing agent);

20.0 wt % of diphenyl-cresyl-phosphate (flame-proofing agent);

0.6 wt % of triethyl phosphate (flame-proofing agent);

1.3 wt % of silicone stabilizer (OS 710 by Bayer AG, Leverkusen); and 0.1 wt % of water;

was employed in each of Examples 1A to 1F to produce foams on a standard laminator from the components listed in Table 1.

Examples 1A to 1F show the superiority of the foams of the present invention with regard to behavior under fire as compared to foaming with pure amine-activation (Example 1D), foaming at a low isocyanate-index (Example 1E) and foaming with a high content of 2,4'- and 4,4'-diphenyl-methane diisocyanate in MDI (Example 1F).

TABLE 1

| | Examples | | | | | |
|---|---|---|---|---|---|---|
| | 1A | 1B | 1C | 1D | 1E | 1F |
| Polyol mixture (parts by weight) | 100 | 100 | 100 | 100 | 100 | 100 |
| Monofluorotrichloromethane (parts by weight) | 34 | 34 | 34 | 34 | 32 | 34 |
| Dimethyl-cyclohexylamine (parts by weight) | 1.6 | 0.3 | 0.3 | 3.2 | 1.6 | 1.6 |
| Dimethyl ethanolamine (parts by weight) | — | 0.3 | 0.3 | — | — | — |
| Dibutyl tin dilaurate (parts by weight) | 0.3 | 0.06 | 0.06 | — | 0.03 | 0.03 |
| Potassium acetate (parts by weight) | — | 0.2 | 0.2 | — | — | — |
| Diethylene glycol (parts by weight) | — | 0.7 | 0.7 | — | — | — |
| Crude MDI having about 40% of 2,4'- and 4,4'-diphenylmethane diisocyanate (parts by weight) | 145 | 145 | 160 | 145 | 130 | — |
| Crude MDI having 55%, by weight, of 2,4'- and 4,4'-diphenylmethane diisocyanate (parts by weight) | — | — | — | — | — | 145 |
| Isocyanate-index | 1.16 | 1.16 | 1.28 | 1.16 | 1.04 | 1.16 |
| Behavior under fire according to DIN 4102 | | B2 | B2 | B3 | B3 | B3 |
| Height of flames (mm) | 145 | 130 | 140 | 150 | 150 | 150 |
| Setting time (sec) on high-pressure apparatus | 23 | 25 | 25 | 24 | 24 | 24 |
| Apparent density ($kg/m^3$) in the plate | 37 | 37 | 38 | 38 | 38 | 36 |

Example 2

A polyol mixture made up of:

41 wt % of sucrose/propylene glycol-started propylene oxide-polyether used in the mixture of Example 1;

38 wt % of tris-($\beta$-chloroethyl)-phosphate;

5 wt % of polyol having an OH number of 440, based on phosphonic acid ester used in the polyol mixture of Example 1;

12 wt % of glycerol;

0.5 wt % of water; and 1.5 wt % of silicone stabilizer used in the polyol mixture of Example 1;

was mixed with the components identified in the formulations given below on a high pressure apparatus and compressed in a mold which was $2\times1\times0.08$ $m^3$ in size to an apparent density of 45 $kg/m^3$.

TABLE 2

| | 2A | 2B |
|---|---|---|
| Polyol mixture (parts by weight) | 100 | 100 |
| Potassium acetate (parts by weight) | 0.5 | — |
| Triethylamine (parts by weight) | 0.9 | 1.4 |
| Diethylene glycol (parts by weight) | 1.5 | 1.5 |
| Trichloromonofluoromethane | 46 | 46 |

TABLE 2-continued

| | 2A | 2B |
|---|---|---|
| (parts by weight) | | |
| Crude MDI having 55%, by weight, of 2,4'- and 4,4'-diphenylmethane diisocyanate (parts by weight) | 163 | 163 |
| Height of flames | 120 mm | >150 mm |
| Setting time on the apparatus | 70 sec | 70 sec |
| Isocyanate-Index | 1.40 | 1.40 |

Example 2 demonstrates the advantage of combined carboxylic acid salt/amine catalysis as compared with pure amine catalysis as far as behavior under fire is concerned. The system is suitable for the production of moldings and sandwich elements. With otherwise identical parameters, the foam according to Example 2A passed the B2 test, while the foam according to Example 2B did not.

Example 3

A polyol mixture for the production of spray-on foams was made up of:

10.0 wt % of sucrose/propylene glycol-propylene oxide-polyether (OH number 380, having 40 wt % of propylene glycol-propylene oxide-polyether).
28.5 wt % of the ester of phthalic acid anhydride and ethylene glycol (OH number 270);
14.4 wt % of ethylene diamine-propylene oxide-polyether (OH number 630);
9.5 wt % of ethylene diamine-propylene oxide-polyether (OH number 470);
7.7 wt % of glycerin;
28.7 wt % of tris-chloroethyl-phosphate;
1.0 wt % of silicone stabilizer (L 5420, Union Carbide Co.); and
0.2 wt % of water.

This polyol mixture was used in each of Examples 3A to 3C to produce a foam from the component listed in Table 3 using a spraying apparatus. The volumetric 1:1 metering of the polyol mixture included an activator and a blowing agent against the quantity of MDI listed in Table 3.

TABLE 3

| | 3A | 3B | 3C |
|---|---|---|---|
| Polyol mixture (parts by weight) | 100 | 100 | 100 |
| Monofluorotrichloromethane (parts by weight) | 23 | 23 | 23 |
| Dimethyl-cyclohexylamine (parts by weight) | — | 8 | 0 |
| Triethylamine (parts by weight) | 0.04 | — | 0.04 |
| Dibutyl tin dilaurate (parts by weight) | 0.26 | — | 0.26 |
| Crude MDI having about 40% of 2,4'- and 4,4'-diphenylmethane diisocyanate (parts by weight) | — | — | 120 |
| Crude MDI having 55% by weight, of 2,4'- and 4,4'-diphenylmethane diisocyanate (parts by weight) | ≈120 | ≈127 | — |
| Isocyanate-Index | ≈1.23 | ≈1.30 | ≈1.23 |
| Behavior under fire according to DIN 4102 | B2 | B3 | B2 |
| Height of flames (mm) | 135 | 150 | 125 |
| Setting time (sec) on the injection molding apparatus | 4 | 5 | 4 |
| Apparent density of 5-ply injection-molded foam at about 12 mm thickness ($kg \cdot m^3$) | 58 | 60 | 59 |

Example 3 demonstrates the superiority of an injection-molded foam produced using an amine-tin catalyst with respect to behavior under fire as compared with a purely amine-activated foam according to the prior art (Example 3B). The advantages of MDI having a lower content of 2,4'- and 4,4'-diphenylmethane diisocyanate with respect to behavior under fire may be seen in Example 3C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid, closed-cell, flame-resistant polyurethane foam which is the reaction product of
- (a) a polyol mixture which is made up of
  - (1) from 25 to 43 wt % flame-proofing agent,
  - (2) from 5 to 50 wt % sucrose polyether having an OH number of from 350 to 550,
  - (3) from 0 to 30 wt % amine initiated polyether having an OH number of from 400 to 800,
  - (4) from 0 to 30 wt % polyether other than components (2) and (3) and/or polyesters having an OH number of from 160 to 600,
  - (5) from 4 to 13 wt % glycerol,
  - (6) from 0.5 to 3 wt % of silicone stabilizer, and
  - (7) from 0.05 to 1.5 wt % of water, with
- (b) a polyphenyl-polymethylene-polyisocyanate containing from 30 to 60 wt % of 4,4'- and 2,4'-diphenylmethane diisocyanate in an NCO to OH equivalent ratio of from 1.07 to 1.45 and in the presence of
- (c) a catalyst mixture made up of at least two components selected from
  - (1) tertiary amines
  - (2) alkali metal carboxylates,
  - (3) quaternary ammonium carboxylates, and
  - (4) organic tin compounds.

2. The polyurethane foam of claim 1 in which component (b) is a polyphenyl-polymethylene-polyisocyanate containing from 30 to 49 wt % of 4,4'- and 2,4'-diphenylmethane diisocyanate.

3. The polyurethane foam of claim 1 in which component (a)(1) is a phosphorus- and/or halogen-containing compound.

4. The polyurethane foam of claim 1 in which the NCO to OH equivalent ratio is from 1.11 to 1.35.

5. A process for the production of a rigid, closed-cell, flame-resistant polyurethane foam comprising reacting:
- (a) a polyol mixture which is composed of
  - (1) from 25 to 43 wt % of flame-proofing agent,
  - (2) from 5 to 50 wt % sucrose polyether having an OH number of from 350 to 550,
  - (3) from 0 to 30 wt % amine initiated polyether having an OH number of from 400 to 800,
  - (4) from 0 to 30 wt % polyether other than components (2) and (3) and/or polyester having an OH number of from 150 to 600,
  - (5) from 4 to 13 wt % glycerol,
  - (6) from 0.5 to 3 wt % silicone stabilizer, and
  - (7) from 0.05 to 1.5 wt % water with
- (b) a polyphenyl-polymethylene-polyisocyanate containing from 30 to 60 wt % of 4,4'- and 2,4-diphenylmethane-diisocyanate in an NCO to OH equivalent ratio of from 1.07 to 1.45 in the presence of
- (c) a catalyst mixture made up of at least two components selected from
  - (1) tertiary amines, (2) alkali metal carboxylates, (3) quaternary ammonium carboxylates, and (4) organic tin compounds.

6. The process of claim 5 in which component (b) is a polyphenyl-polymethylene-polyisocyanate containing from 30 to 49 wt % of 4,4′- and 2,4′-diphenylmethane diisocyanate.

7. The process of claim 5 in which component (a)(1) is a phosphorus- and/or halogen-containing compound.

8. The process of claim 5 in which the NCO to OH equivalent ratio is from 1.11 to 1.35.

9. A polyol mixture which comprises (1) from 25 to 43 wt % of flame-proofing agent, (2) from 5 to 50 wt % sucrose polyether having an OH number of from 350 to 550, (3) from 0 to 30 wt % amine initiated polyether having an OH number of from 400 to 800, (4) from 0 to 30 wt % polyether other than components (2) and (3) and/or polyester having an OH number of from 150 to 600, (5) from 4 to 13 wt % of glycerol, (6) from 0.5 to 3 wt % silicone stabilizer, and (7) from 0.05 to 1.5 wt % water.

* * * * *